S. C. Ellis,

Laying Out Doors & Sash.

No. 99,866.   Patented Feb. 15, 1870.

Witnesses:
Fred. Haynes
R. E. Rabeau

Seth C. Ellis

United States Patent Office.

SETH C. ELLIS, OF JERSEY CITY, NEW JERSEY.

Letters Patent No. 99,866, dated February 15, 1870.

IMPROVEMENT IN MACHINE FOR LAYING OUT DOORS AND SASH.

The Schedule referred to in these Letters Patent and making part of the same.

*To all whom it may concern:*

Be it known that I, SETH C. ELLIS, of Jersey City, in the county of Hudson, and State of New Jersey, have invented a new and useful Improvement in Machines for Laying Out Doors, Sashes, and other work, of which the following is a full, clear, and exact description, reference being had to the accompanying drawing, forming part of this specification, and in which—

Figure 1:
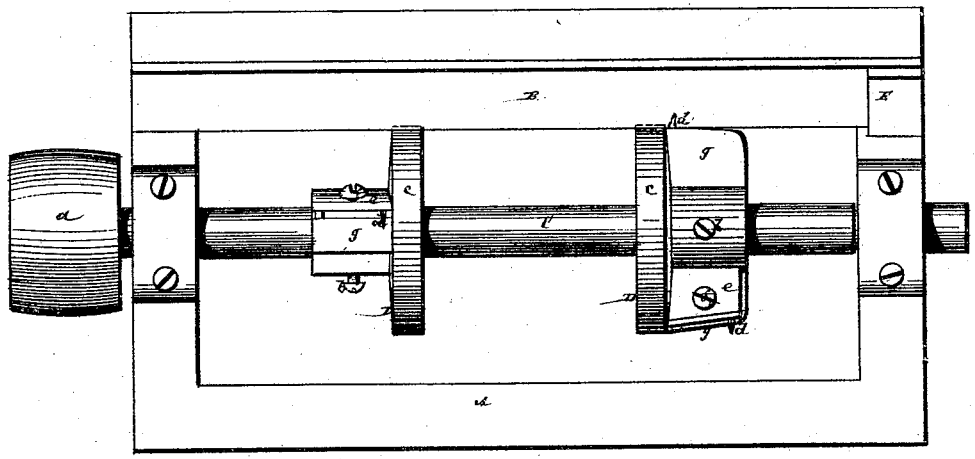

Figure 1 represents a plan, and

Figure 2:
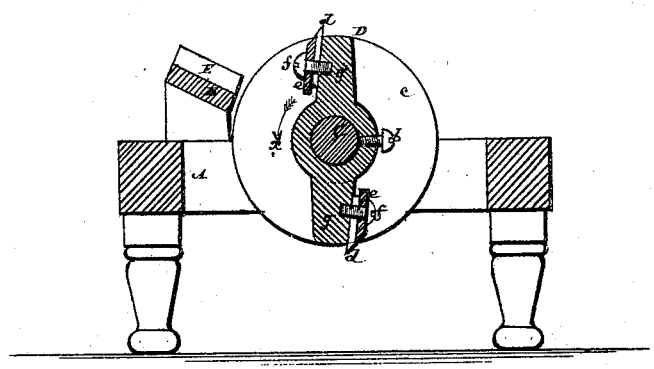

Figure 2, a transverse section of a machine constructed in accordance with my improvement.

Similar letters of reference indicate corresponding parts.

My improvement relates to machines for laying out doors, window-sashes, and other like work, by gauging and scribing in an automatic manner, to insure accuracy and rapidity in manufacturing by bulk or quantity work of like size, the places or lengths at which cuts are to be made in the several pieces composing the work, and to this end The invention consists in a combination of one, two, or more circularly-traveling or revolving scribing heads, made adjustable in direction of the length of their axes, and carrying suitably-set scribers or markers, with a stationary bed or support for the work, and a stop to determine its proper position on the bed relatively to the markers, substantially as hereinafter described.

Referring to the accompanying drawing—

A represents the frame of the machine, and

B the bed or support for the work.

This bed, which runs in direction of the length of the machine on one side of it, is set inclining, as regards its transverse section or width, in a downward direction toward a longitudinally-arranged horizontal shaft C, that has circular or revolving motion communicated to it, in direction of the arrow *x*, by a pulley, *a*, or otherwise.

On this shaft C are arranged any number of scribing heads D D, adjustable by means of set screws *b b* along the shaft, to vary their width apart or distance from a stop, E, to suit different work or gauged cuts to be made therein. The stop E may also be made adjustable relatively to the scribing heads, or along the bed B, for the same purpose.

The scribing heads D D are each made up of a disk or circular portion, *c*, of a diameter sufficient to bring its periphery in moderately close relationship to but not absolute contact with the front edge of the bed B, so that said disks will act as stops for the stuff or piece of timber being marked to slide down or rest against as it is being scribed, and whilst the scribers or markers come round to scratch it. Said disks *c* also serve by their rotation and contact with the stuff, stick, or other piece being laid out, to rub against and keep the same from jumping, and there is no labor of handling or feeding up the stuff beyond placing it on the bed B, with its one end pressed up against the stop E, the work being self-feeding by reason of the inclination of the bed, which saves much time and labor.

The scribers *d d*, of which there may be any number, are held by clamps *e e* and set screws *f f* in an adjustable manner, on or along radial arms or projections *g g*, fast to the sides of the disks *c*, and forming part of the scribing heads. These scribers project slightly beyond the peripheries of the disks *c*, as it were, so as to mark or cut into the work, and where each head is required to lay out a mortise they should be arranged in pairs on opposite sides of the axis thereof, and out of line with each other, but the disposition of the markers will of course vary with the work to be done. It is desirable, however, in all or most cases, to so point or bevel them as that in marking or cutting into the work they will exert a tendency to draw or keep it pressed up against the stop E, to insure steadiness of the work on its bed, and accuracy in the gauging or scribing of it.

What is here claimed, and desired to be secured by Letters Patent, is—

1. The circularly-traveling scribing heads D, constructed of a disk, *c*, and scriber-holding side arms or wings *g*, essentially as shown and described.

2. The combination and arrangement relatively to each other of the inclined bed B, with its end stop E, and the revolving scribing heads D, made adjustable along their shaft C, and constructed to operate essentially as herein set forth.

SETH C. ELLIS.

Witnesses:
FRED. HAYNES,
R. E. RABEAU.